Sept. 18, 1951 C. E. SCHWANEKE 2,567,973
EQUIPMENT FOR INSTRUCTION IN INSTRUMENT FLYING
Filed May 6, 1946 2 Sheets-Sheet 1

INVENTOR.
CLARENCE E. SCHWANEKE
BY
ATTORNEY

Sept. 18, 1951    C. E. SCHWANEKE    2,567,973
EQUIPMENT FOR INSTRUCTION IN INSTRUMENT FLYING
Filed May 6, 1946    2 Sheets-Sheet 2

INVENTOR.
CLARENCE E. SCHWANEKE
BY
ATTORNEY

Patented Sept. 18, 1951

2,567,973

UNITED STATES PATENT OFFICE 2,567,973

EQUIPMENT FOR INSTRUCTION IN INSTRUMENT FLYING

Clarence E. Schwaneke, United States Marine Corps

Application May 6, 1946, Serial No. 667,550

6 Claims. (Cl. 244—121)

(Granted under the act of March 3, 1883, as amended April 30, 1928; 370 O. G. 757)

This invention relates to equipment for instruction in flying aircraft and more particularly to equipment for instruction in instrument flying.

Objects of the invention are to provide improved equipment for installation in aircraft for obscuring the external view of student pilots without impairing their view of the instruments within the aircraft nor the external view of an instructor; to provide improved equipment of the character referred to that may be easily installed in aircraft, is light in weight, and does not interfere with operation of the aircraft; and to provide improved equipment of the character described and for the purposes set forth.

In accomplishing these and other objects of the present invention, I have provided improved details of structure, a preferred form of which is shown in the accompanying drawing, wherein:

Fig. 4 is a fragmentary cross-sectional view along the line 4—4 of Fig. 1;

Figure 1:
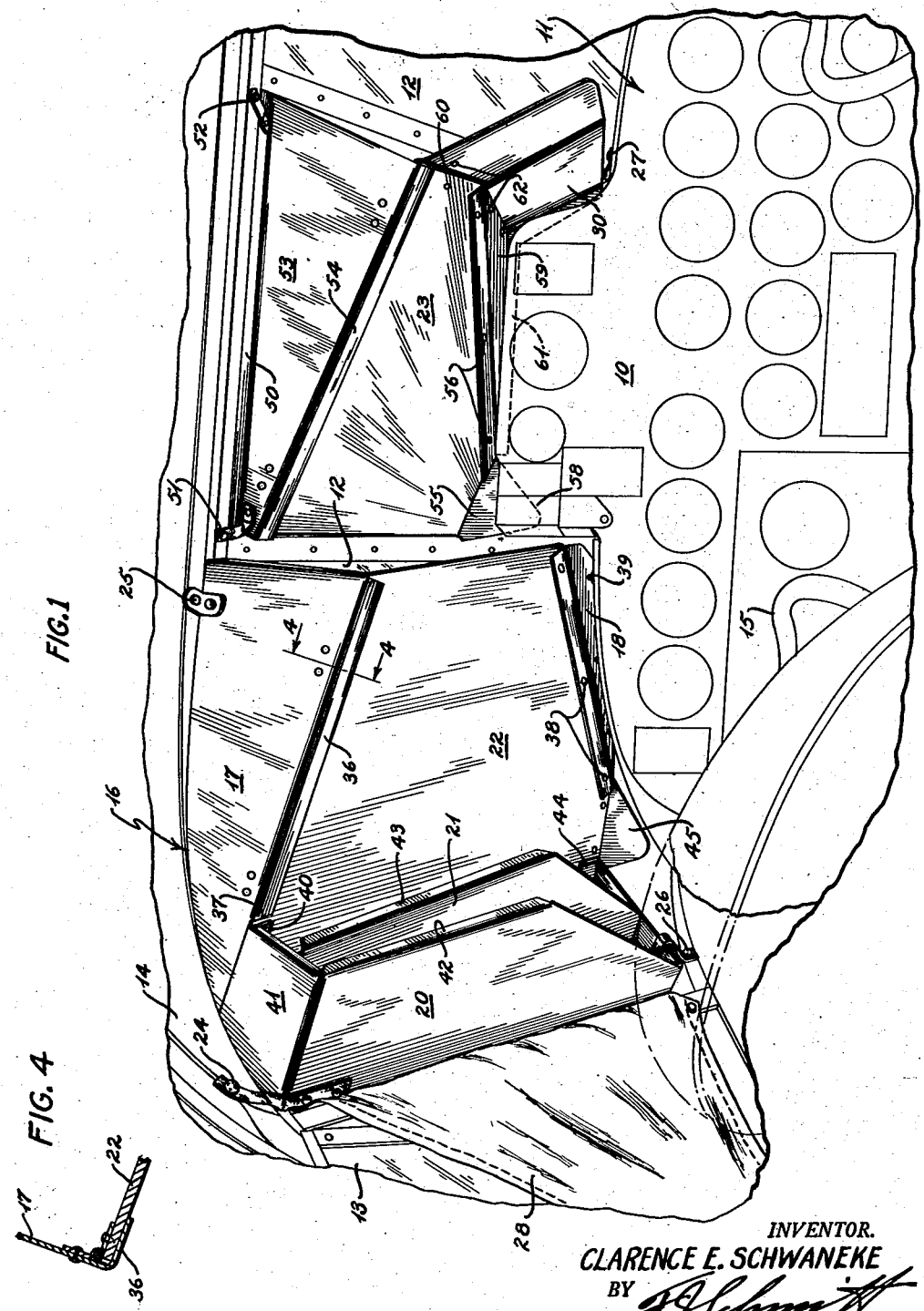
Figure 1 is a perspective view substantially as seen from the eyes of the student of a portion of the interior of an aircraft with equipment embodying the features of the present invention installed therein.

Referring more in detail to the drawings:

There is shown at 10 a portion of the interior of an aircraft, which may be of any known design having dual controls. The aircraft includes an instrument panel 11, having instruments of known design mounted thereon, a port windshield 12, a port side window 13, a similar windshield and side window on the starboard side, and an overhead 14. The aircraft may be operated either by a control stick 15 on the port side or by a similar control stick 15' on the starboard side. When the aircraft is used for instructional purposes, the student pilot ordinarily occupies the port seat and uses the port control stick, while the instructor sits to the right of the student. Since the structure of the plane is not per se a part of the present invention, it is not shown in further detail.

The equipment with which the present invention is concerned is generally designated 16 and comprises louvre forming means that covers the windshield to obscure the view of the student pilot while permitting substantially unobstructed vision for the instructor.

Attached over the port windshield, Fig. 1, is a panel 17 having an overhanging edge 36 along a portion thereof, the edge 36 being discontinued at the end 37 thereof for purposes to be hereinafter apparent. The panel 17 is attached to the airplane as by snap fastener 25.

Hingedly or otherwise connected to panel 17, as for example by the hinge shown in cross-section in Fig. 4, is a second panel 22, having secured thereto, as by bolts 38, a rigid support member 18, which has a snap connector 39 therein for securing the support member 18 to the structure of the aircraft. Panel 22 has a tab 45 secured thereto, as shown.

Secured to the left hand end of the panel 22, as viewed in Fig. 1, is a U-shaped member 41, having edges 40 and 44 which may be welded or otherwise secured to panel 22, and having a wing portion constituting a vane 20 having turned edge 42. The lower portion of member 41 has a turned up edge 19, Fig. 3.

Mounted in the U-shaped member 41, and secured thereto in any convenient manner, as by welding, is a vane 21 parallel to vane 20, the vane 21 having turned edge 43, the vanes 21 and 20 constituting a louvre for obscuring the vision of the student.

Figure 5:
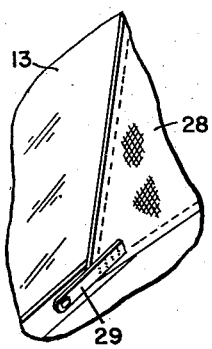
Fig. 5 is a fragmentary view of the student's curtain and means for attaching the outer end of the curtain to the wall of the plane.

Member 41 is attached to the wall of the aircraft as by snap fasteners 24 and 26, and has attached thereto a curtain 28 for obscuring the view of the student through the side window. The end of curtain 28 may be secured to the wall of the plane by snap fastener 29, Fig. 5.

A second shield device generally designated 50 provides covering for the center window portion of the aircraft, and comprises an upper triangular shaped panel member 53 connected to the aircraft by snap fasteners 51 and 52, having overhanging edge 54, and having hingedly or otherwise connected thereto a five-sided panel 23, having secured thereto a tab or flap 55 adapted to be tucked behind the portion 58 of the instrument panel 11 to secure the panel member 23 in place.

Panel 23 has secured thereto as by bolts or rivets 56 a rigid support member 59 having a rigid curtain 30 secured thereto, curtain 30 being also secured to the side 60 of panel 23 as by bolts 62. The rigid curtain 30 is secured to the framework of the aircraft as by snap fastener 27. The member 59 has a turned down edge 61 which may be hooked behind the instrument panel, as shown.

Figure 2:
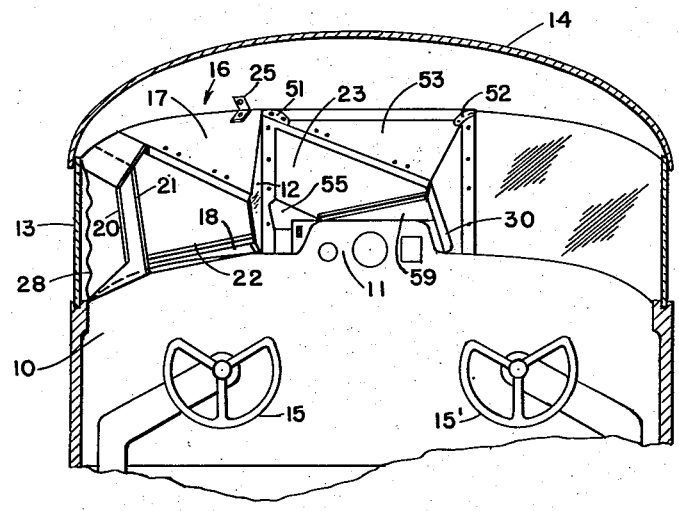
Figure 2 represents, somewhat diagrammatically, a section taken vertically through the upper part of the aircraft on a transverse plane just behind the control sticks, with my improved structure shown in elevation.
Figure 3:
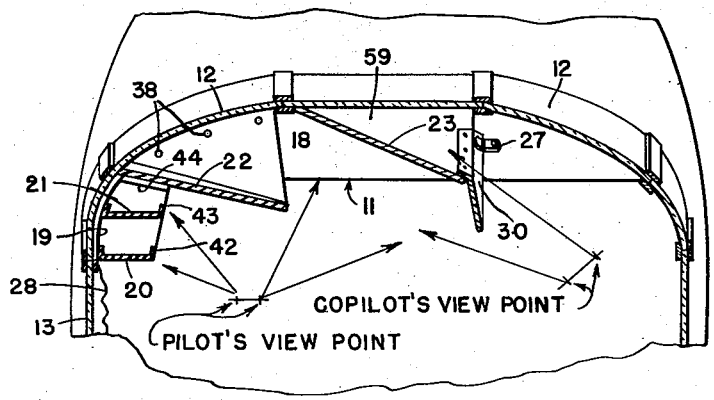
Figure 3 is another diagrammatic view showing my improved structure in association with the windshield sections, all in horizontal section.

Figs. 2 and 3 show additional details of the above-described apparatus.

I have illustrated the equipment of the present invention as comprising four panel members and two vanes forming three louvres; however, it is obvious that the exact number of louvres employed is a matter of design and may be varied as desired. Likewise, it is obvious that the specific configuration of the frame members, shield members, curtain, and wing member is subject to variation depending on the type of aircraft in which the equipment is to be installed. In each case the equipment is designed to fit the contours of the aircraft and to obscure the external view of the student while leaving the view of the instructor substantially unimpaired.

In operation, the student maneuvers the aircraft by use of the control stick 15 and determines his position solely by observation of the instruments. He must rely on the instruments, since his external view forward is obscured by the members 20, 21, 22 and 23 and his view to the left and right by the curtains 28 and 30 respectively. At the same time, the instructor may look out of the aircraft through his own windshield directly and through the student's windshield through the louvres formed between the shield members. While the student guides the aircraft from observation of the instruments, the instructor is able to insure safety by observing directly whether the student is guiding the aircraft properly.

While I have shown but a single embodiment of the present invention, it is obvious that the device is subject to modification without departing from the spirit of the invention. Therefore, I do not wish to be limited by the disclosure set forth, but only by the scope of the appended claims.

The invention described herein may be manufactured and used by or for the Government of the United States of America for governmental purposes without the payment of any royalties thereon or therefor.

What is claimed is:

1. Apparatus of the character disclosed for instruction in instrument flying for use on aircraft having student and instructor seats therein and having a windshield, in combination, panel means comprising first and second panels operatively connected together and adapted to be disposed over a portion of the windshield, fastener means secured to the first panel and adapted to be attached to the wall of said aircraft to hold said first panel securely in place upon said wall, said second panel having secured thereto means forming a pair of substantially parallel vanes, a support member secured to said second panel, additional fastener means secured to said support member and adapted to be attached to said wall to hold said support member securely in place, said second panel being much wider than said vanes, said second panel and vanes, while the second panel and vanes are attached to said wall, being disposed in predetermined positions whereby the view of a student seated in the student seat is substantially completely obstructed through a large portion of said windshield while the view through said portion of an instructor seated in the instructor's seat is substantially unimpeded.

2. In apparatus of the character disclosed for instruction in instrument flying for use on aircraft having student and instructor seats therein and having a curved windshield and curved front wall, in combination, panel means including first and second panels operatively connected together, said first panel being curved to fit the curvature of said wall and windshield, a pair of substantially parallel vanes supported by said second panel, said second panel being adapted to be disposed over a portion of the windshield, fastener means secured to said first panel and adapted to be attached to said first wall to hold said panel securely in place upon said wall, a support member secured to said second panel, additional fastener means secured to said support member and adapted to be attached to said wall to hold said support member securely in place thereupon, said support member being curved to fit the curvature of the wall, said second panel being much wider than the aforementioned pair of vanes, said vanes and panels, while the panels and support member are attached to said wall, being disposed in predetermined positions whereby the view of a student seated in the student seat is substantially completely obstructed through a large portion of said windshield while the view through said portion of an instructor seated in the instructor's seat is substantially unimpeded.

3. In apparatus of the character disclosed for instruction in instrument flying for use on aircraft having student and instructor seats therein and having a curved windshield and curved front wall, said apparatus being readily detachable from the airplane, in combination, a first panel having a second panel secured to one end thereof, said first panel being curved to the curvature of said wall, fastener means secured to said first panel and adapted to fasten said first panel securely to said wall, a support member curved to the curvature of said wall and secured to said second panel, other fastener means attached to said support member and adapted to secure said support member to said wall, means forming a pair of substantially parallel vanes attached to said second panel, further fastener means secured to said vane forming means for securing said vane forming means to said wall, said panels and vanes, while the panels, support member, and vane forming means are fastened to said wall being disposed in predetermined positions whereby the view of a student seated in the student seat is substantially completely obstructed through a portion of said windshield while the view through said portion of an instructor seated in the instructor's seat is substantially unimpaired.

4. Apparatus according to claim 3 wherein said aircraft is further characterized as having a side window on the student side, and including in addition a triangular curtain secured to said vane forming means, and additional fastener means secured to said curtain for securing said curtain to said wall, said curtain obscuring the view of the student through the window.

5. In apparatus of the character disclosed for instruction in instrument flying for use on aircraft having student and instructor seats therein and having a windshield and front wall, in combination, a triangular panel, a pair of fastener means attached to the ends of said panel respectively and adapted to hold said panel securely to said aircraft, a five sided panel having two short sides and three long sides and having one of said long sides operatively connected to said triangular panel, and a rigid curtain extending from one small side of said five sided panel at an angle thereto, said apparatus while in place over said windshield substantially completely obscuring the view of a student seated in the student seat through a predetermined portion of said windshield while the view of the instructor seated in the instructor's seat through said portion is substantially unimpeded.

6. Apparatus of the character disclosed for instruction in instrument flying for use on aircraft having student and instructor seats therein and having a curved windshield of at least two sections and curved front wall, comprising, in combination, a first panel having a second panel secured to one end thereof, said first panel being curved to the curvature of said wall, fastener means secured to said first panel and adapted to fasten said first panel securely to said wall, a support member curved to the curvature of said wall and secured to the lower end of said second panel, other fastener means attached to said support member and adapted to secure said support member to said wall, means forming a pair of substantially parallel vanes attached to said second panel, further fastener means secured to said vane forming means for securing said vane forming means to said wall, said vanes and panels, while the panels, support member, and vane forming means are fastened to said wall being disposed in predetermined positions whereby the view of a student seated in the student seat is substantially completely obstructed through a first section of said windshield while the view through said first section of an instructor seated in the instructor's seat is substantially unimpaired, a triangular panel, a pair of additional fastener means attached to said triangular panel and adapted to hold said bar member securely to the aircraft over the other section of the windshield, a five sided panel having two short sides and three long sides and having one of said long sides secured to said triangular panel, and a rigid curtain extending from one small side of said five sided panel at an angle thereto, said triangular panel, five sided panel, and curtain while in place over said other windshield section substantially completely obscuring the view of said student through said other section while leaving the view of said instructor through said other section substantially unimpaired.

CLARENCE E. SCHWANEKE.

REFERENCES CITED

The following references are of record in the file of this patent:

UNITED STATES PATENTS

| Number | Name | Date |
| --- | --- | --- |
| 1,833,970 | Levick | Dec. 1, 1931 |
| 2,403,195 | Ross | July 2, 1946 |
| 2,417,317 | McMains | Mar. 11, 1947 |